United States Patent [19]

Pitt

[11] Patent Number: 5,564,265
[45] Date of Patent: Oct. 15, 1996

[54] GRASS CATCHER INSERT AND ADAPTER FOR LAWN MOWERS

[76] Inventor: Leo Pitt, 5741 Balfry Dr., West Palm Beach, Fla. 33413

[21] Appl. No.: 202,605

[22] Filed: Feb. 28, 1994

[51] Int. Cl.⁶ .................................................. A01D 34/70
[52] U.S. Cl. ............................................ 56/202; 56/DIG. 9
[58] Field of Search .......................... 56/202, 199, 203, 56/194, DIG. 9

[56] References Cited

U.S. PATENT DOCUMENTS

| | | | |
|---|---|---|---|
| 4,377,063 | 3/1983 | Leaphart | 56/202 |
| 4,598,536 | 7/1986 | Langley | 56/202 |
| 4,989,400 | 2/1991 | Wark | 56/202 |
| 5,042,241 | 8/1991 | Boylston et al. | 56/202 |

Primary Examiner—Terry Lee Melius
Attorney, Agent, or Firm—Norman Friedland

[57] ABSTRACT

An adapter frame and detachable insert bag are fabricated to fit inside of the existing grass catcher bag typically supplied with the hand held lawn mower. The bag is fabricated from a non-woven material and sufficiently porous to be permeable to air and serves to collect and dispose of the grass clippings. The assembled frame and insert bag attaches to and fits flush with the opened end of the grass catcher bag so as not to interfere with the existing attachment mechanism of the grass catcher bag to allow the easy attachment to the lawn mower.

4 Claims, 4 Drawing Sheets

GRASS CATCHER INSERT AND ADAPTER FOR LAWN MOWERS

TECHNICAL FIELD

This invention relates to lawn mowers for cutting grass and particularly to the grass catcher that attaches to the lawn mower to catch and collect the grass clippings.

BACKGROUND ART

As one familiar with using grass catchers that are attached to the lawn mower, the grass clippings collected in the catcher bag typically bunches up and forms a cohesive bundle. In the customary grass catcher bags that are used for the grass catcher removing the clippings when in this state presents a difficult and cumbersome task. Ideally, one would expect to remove the filled bag from the lawn mower and tip it upside down and let gravity take its course. Unfortunately, when the grass forms into clusters it doesn't flow freely through the opening of the bag and the operator has to reach in and remove the clippings manually.

I have found that I can obviate this problem by providing an adapter that fits into the inlet of the bag catcher and include an insert bag that attaches to a lip formed on the inner end of the adapter. The entire assembly then judiciously fits into the aperture formed by the frame of the grass catcher and in turn the attaching mechanism that typically forms part of this frame attaches to the lawn mower. The insert bag is preferably fabricated from a non-woven fabric that includes an open end with a draw string or other means for securing it to the lip of the adapter. The draw string can then be used to close the insert bag when it is removed from the lawn mower and this insert bag and the collected clippings can be then discarded or disposed of as desired.

The non-woven natural or synthetic fiber is sufficiently lose so as to be pervious to air so that the suction effect of the lawn mower is not impaired. The edge of the opened end is folded over and stitched to form a loop for receiving the draw string or tie that is used to tie the bag when being disposed of and for securing it to the lip of the adapter.

The adapter fits into the opened end of the customary grass catcher bag and extends fully into this opened end and lies flush with the outer edge of the opened end so that it will not interfere with the existing attachment means that normally comes with the grass catcher bag. The attaching means that accompanies the lawn mower typically includes a laterally extending rod that fits into a hook formed on the lawnmower so that the grass catcher bat is flush or butt mounted to the discharge opening of the lawn mower.

Side clips are carried on the outer wall of the adapter serves to hold the adapter to the lawn mower grass catcher and Judiciously aligns the opening of the adapter with the opened end of the grass catcher bag to allow for the normal attachment to the lawn mower.

SUMMARY OF THE INVENTION

An object of this invention is a schematic illustration of the lawn mower of the type utilizing the invention to provide improved grass catching means for a lawn mower.

A feature of this invention is an adapter that is fabricated into a frame-like rigid member adapted to receive a specially fitted insert bag so as to fit inside the existing grass catcher bag of the lawn mower.

A feature of this invention is the provision of a nonwoven, porous bag insert and side clips carried by the adapter to judiciously hold the adapter inside the existing grass catcher bag. The insert bag is fabricated from a non-woven pervious material that is disposable, easy to use and together with the adapter alleviates the burdensome and cumbersome problem of removing the grass clippings from the existing grass catcher bag.

The foregoing and other features of the present invention will become more apparent from the following description and accompanying drawings.

BEST MODE FOR CARRYING OUT THE INVENTION

Figure 1:
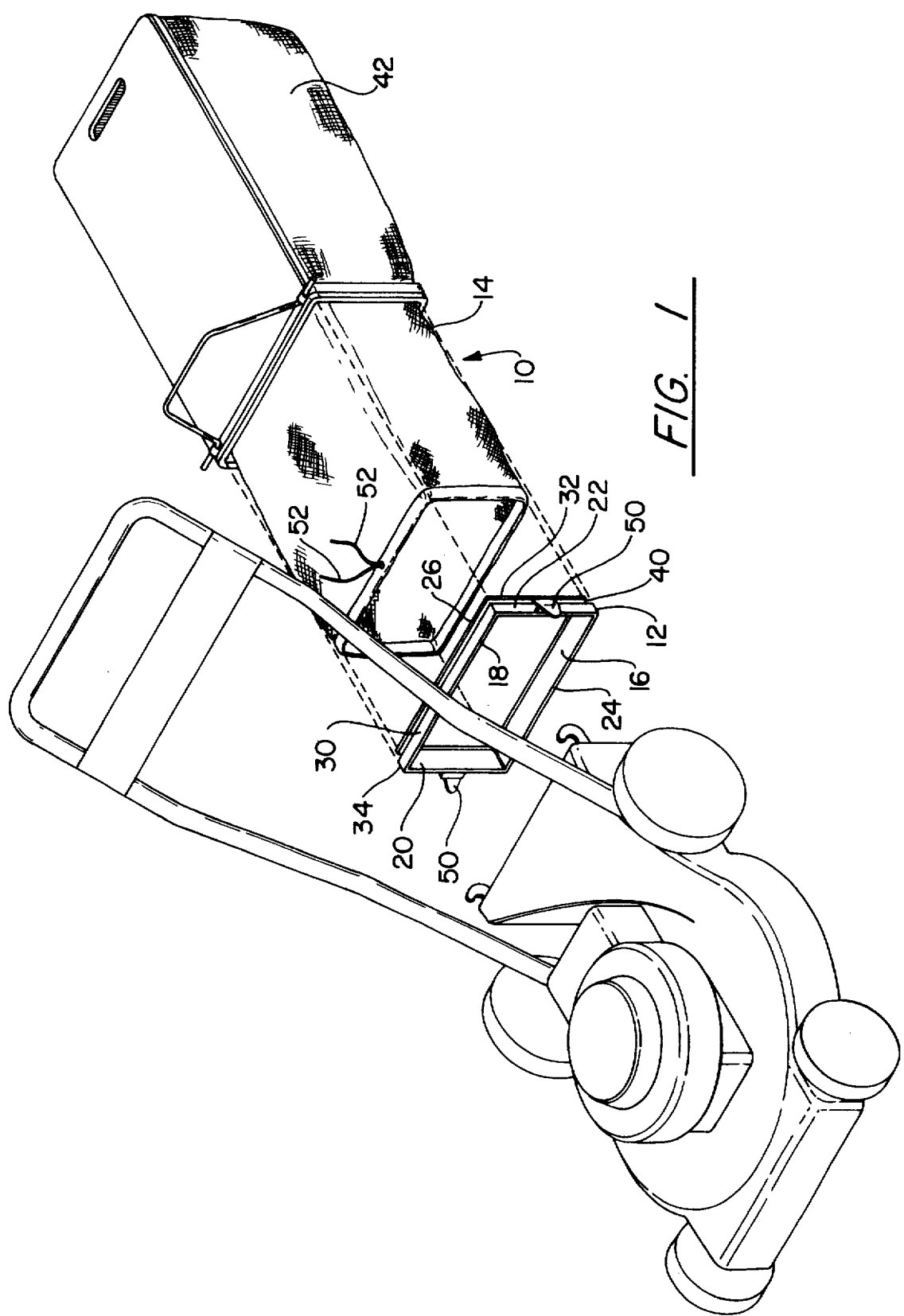
FIG. 1 is an exploded perspective view showing the details of this invention.
Figure 2:
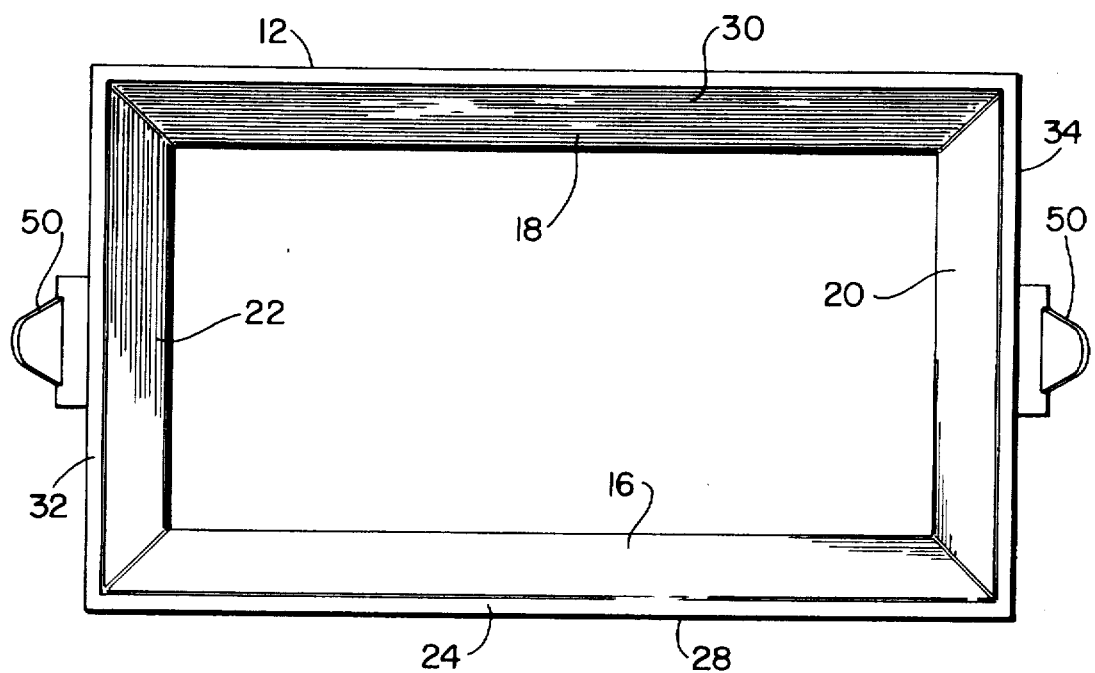
FIG. 2 is a top plan view of the adapter of this invention.
Figure 3:
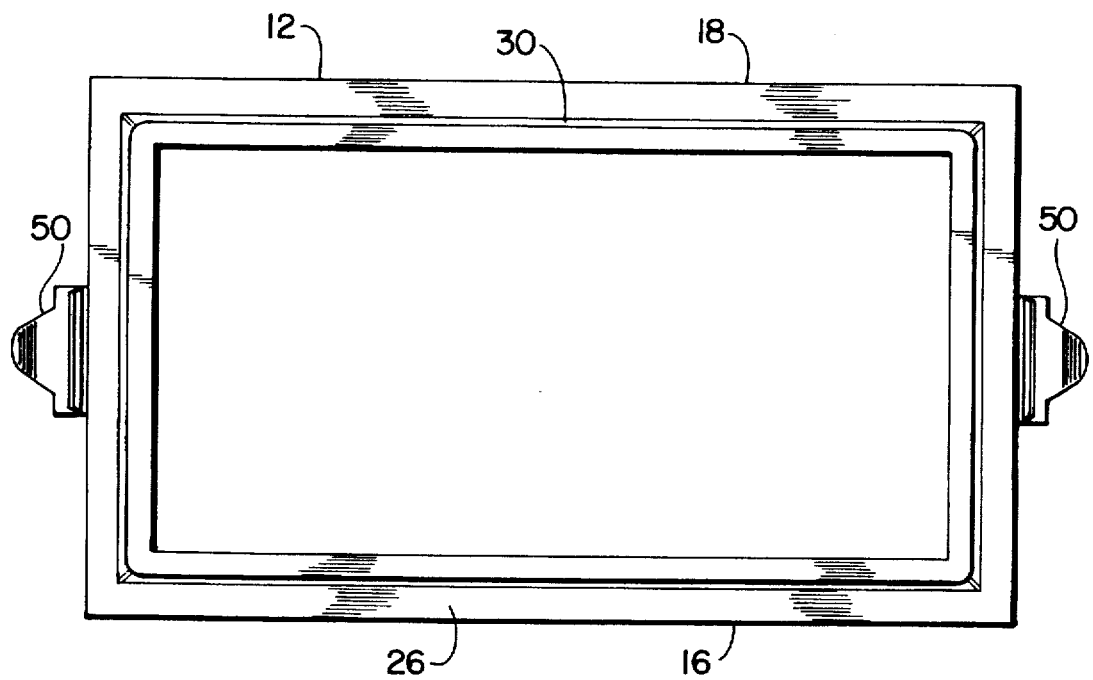
FIG. 3 is a bottom plan view of the adapter depicted in FIG. 2.
Figure 4:
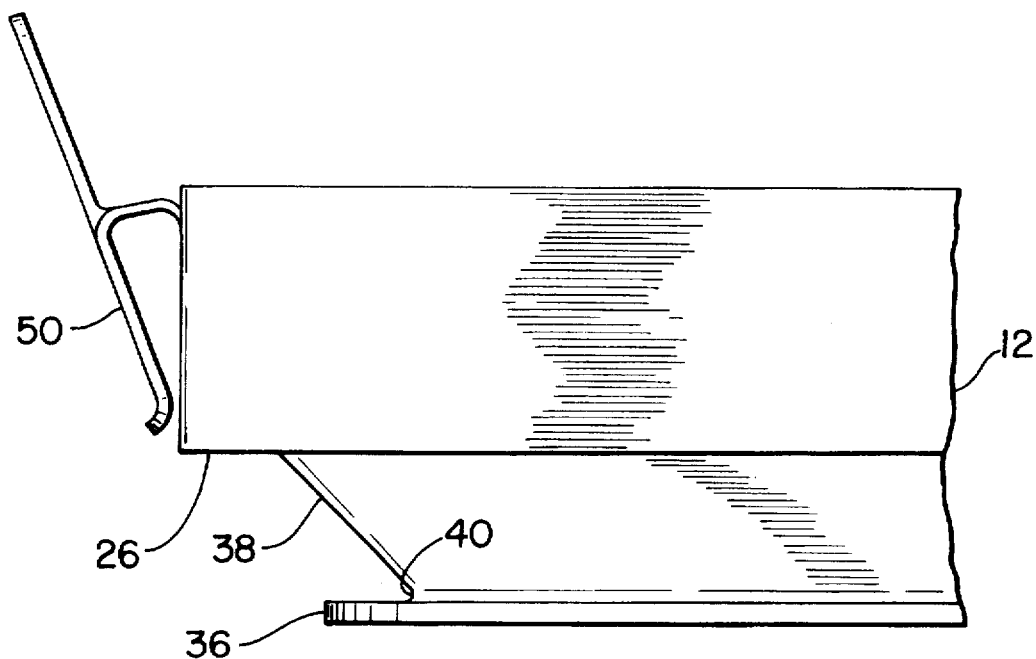
FIG. 4 is a partial side view in elevation illustrating the clip for securing the original grass catcher bag to the adapter of this invention.
Figure 5:
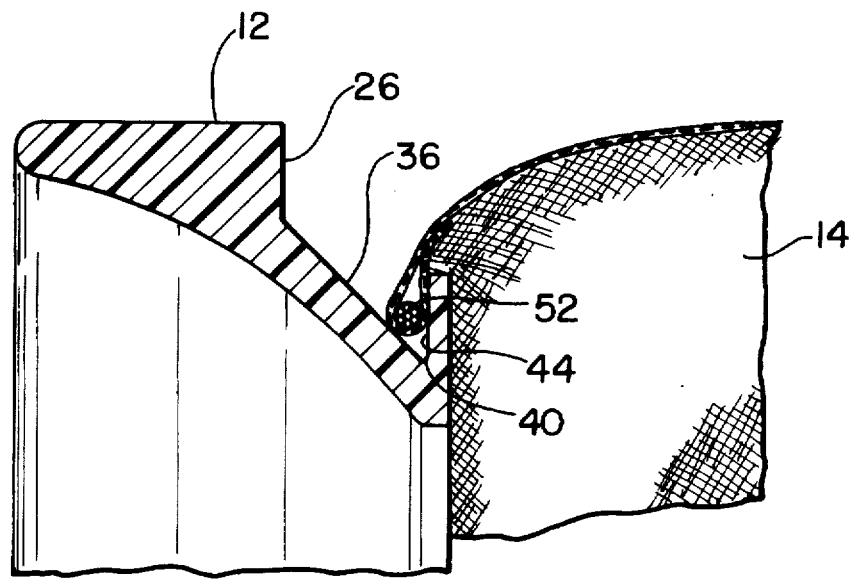
FIG. 5 is a partial view in section illustrating the insert bag attached to the adapter.
Figure 6:
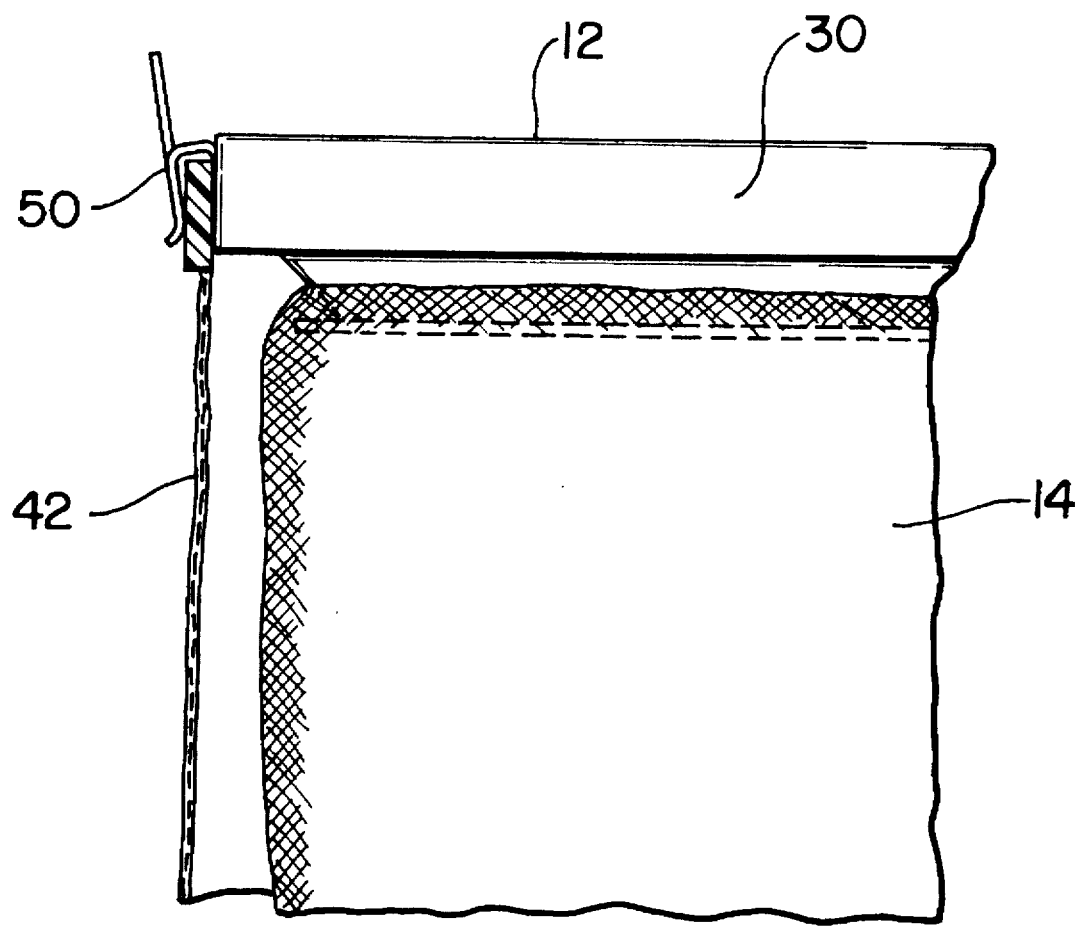
FIG. 6 is a partial view illustrating the relationship of the components of the invention relative to the existing grass catcher bag.

While this invention is shown in its preferred embodiment adapted to be utilized with a lawn mower with a rear grass catcher assembly, it will be appreciated that the invention can be adapted to be utilized on other types of grass catcher assemblies, as for example side mounted grass catcher assemblies, and with grass catcher assemblies with different shaped apertures and the like. The lawn mower may be of the gas or electrical engine types that are commercially available.

To best understand this invention reference is made to all the Figs. which show the grass catcher adapter and insert bag generally illustrated by reference numeral 10 as comprising the adapter 12 and the insert bag 14. Adapter 12 is fabricated from a synthetic or plastic material such as a resinous fiber glass to form a rigid frame. The frame is configured in this instance as a rectangle with opposing side walls 16, 18, 20 and 22 having a top end 24 and bottom end 26. Walls 16, 18, 20 and 22 each have an outer planar surface 28, 30, 32 and 34, respectively, at the top end 24 adapted to snugly and removably fit into the existing frame (not shown) of the existing grass catcher bag. In this instance and as used herein, the grass catcher assembly of the lawn mower includes all the components (removable and non-removable) of the grass catcher bag and attaching mechanism of the lawn mower.

To accommodate the insert bag, the bottom end 26 of adapter 12 is configured in a rectangular shape and includes a continuous outer planar surface 36 and shoulder 38 that define a support surface for the insert bag 14. The bottom end 26 of adapter 12 includes a continuous lateral extending groove 40 extending through the walls 28, 30, 32 and 34 for defining lip 44 to receive the open end 48 of insert bag 12. The end of the insert bag 12 may be folded over to form a channel for accepting the tie or draw string 52.

To attach the insert bag 14 to the adapter 12 the opened end 48 slides over the lip 44 and the tie or draw string is tightened to force the edge of the internal bag at the opened end 48 to fit into the groove 40. The insert bag which is smaller than the existing grass catcher bag of the lawn mower is inserted therein with the adapter 12 being attached thereto. The insert bag as is apparent from the Figs. fits through the opening of the grass catcher bag so as to slide internally of the grass catcher bag 42 of the grass catcher assembly.

The side mounted clamps 50 disposed on opposing sides of the adapter frame 12 serve to clamp the frame to the existing grass catcher bag to hold the frame and insert bag assembly inside the existing grass catcher bag and to align the top edge of frame 12 with the outer edge of the open end of the existing grass catcher bag. Suitable clamps may be commercially available binder clips having one portion of the movable legs mounted integrally with the wall so that the other leg is moveable relative thereto to open and close so as to clamp the grass catcher bag. This mounting assures that the frame doesn't obstruct the existing attaching mechanism so that it can be readily attached to the lawn mower.

Although this invention has been shown and described with respect to detailed embodiments thereof, it will be appreciated and understood by those skilled in the art that various changes in form and detail thereof may be made without departing from the spirit and scope of the claimed invention.

I claim:

1. For a lawn mower that includes a grass catcher bag that is detachable for removing the collected grass clippings comprising adapter means that fits inside the grass catcher bag and is supported thereto, and a detachable insert bag means made from a non-woven material having an opened end attached to said adapter means for fitting into the grass catcher bag, said detachable bag having a circumscribing folded-over portion adjacent to the edge of said opened end for forming a channel and a draw string disposed in said channel having the ends extending exterior thereof through an opening formed in said folded-over portion, and said adapter frame defining another open channel which includes opposing wall means having an outer planar surface adapted to fit adjacent to the inner surface of the grass catcher bag and being in sliding relationship relative thereto and a stepped down portion for supporting said insert bag means, and including an outer peripheral groove formed on and circumscribing the outer surface of said opposing wall means.

2. For a lawn mower that includes a grass catcher bag that is detachable for removing the collected grass clippings as claimed in claim 1 including clip means mounted on the outer surface of a portion of said wall means for supporting said adapter frame to the grass catcher bag and aligning the outer edge of said adapter frame to be flush with the outer edge of the grass catcher bag.

3. For a lawn mower that includes a grass catcher bag that is detachable for removing the collected grass clippings as claimed in claim 2 where said clip means includes at least one binder clip.

4. For a lawn mower that includes a grass catcher bag that is detachable for removing the collected grass clippings as claimed in claim 2 wherein said clip means includes a pair of binder clips attached to opposite portions of said opposing wall means.

\* \* \* \* \*